United States Patent [19]
Broussard et al.

[11] Patent Number: 6,068,033
[45] Date of Patent: May 30, 2000

[54] TIMBER HARVESTER

[76] Inventors: James D. Broussard, P.O. Box 176; Patrick Bill Bailey, P.O. Box 525, both of Colmesneil, Tex. 75938

[21] Appl. No.: 09/078,623

[22] Filed: May 14, 1998

[51] Int. Cl.[7] .............................. B27C 9/00; A01G 23/00
[52] U.S. Cl. .................. 144/3.1; 83/371; 83/928; 83/471.2; 144/4.1; 144/24.13; 144/338; 144/357; 144/367; 144/379; 144/343
[58] Field of Search .............................. 83/369, 370, 371, 83/472.2, 928; 144/1.1, 3.1, 4.1, 24.13, 4.6, 335, 338, 343, 356, 357, 367, 379

[56] References Cited

U.S. PATENT DOCUMENTS

| | | | |
|---|---|---|---|
| 3,140,736 | 7/1964 | Propst | 144/3.38 X |
| 3,580,306 | 5/1971 | Tanguay | 83/471.2 |
| 3,642,041 | 2/1972 | Hamilton et al. | 144/338 |
| 3,710,060 | 1/1973 | Carlton et al. | 83/928 |
| 3,720,247 | 3/1973 | Lindblom | 144/4.1 |
| 3,771,395 | 11/1973 | Heimerl | 144/4.1 X |
| 3,868,982 | 3/1975 | Kurelek et al. | 144/338 |
| 3,972,357 | 8/1976 | Neal et al. | 83/928 X |
| 4,779,654 | 10/1988 | Casperson et al. | 144/4.1 X |
| 4,922,976 | 5/1990 | Hacker | 144/338 |
| 5,058,638 | 10/1991 | Hacker | 144/338 |
| 5,699,712 | 12/1997 | Hudson | 144/338 |
| 5,785,101 | 7/1998 | Wildey | 144/338 |
| 5,785,191 | 7/1998 | Wildey | 144/339 |

*Primary Examiner*—W. Donald Bray

[57] ABSTRACT

A harvester is provided including a saw situated on a trailer for cutting purposes. A drive assembly is adapted for guiding logs past the saw for cutting the same.

7 Claims, 3 Drawing Sheets

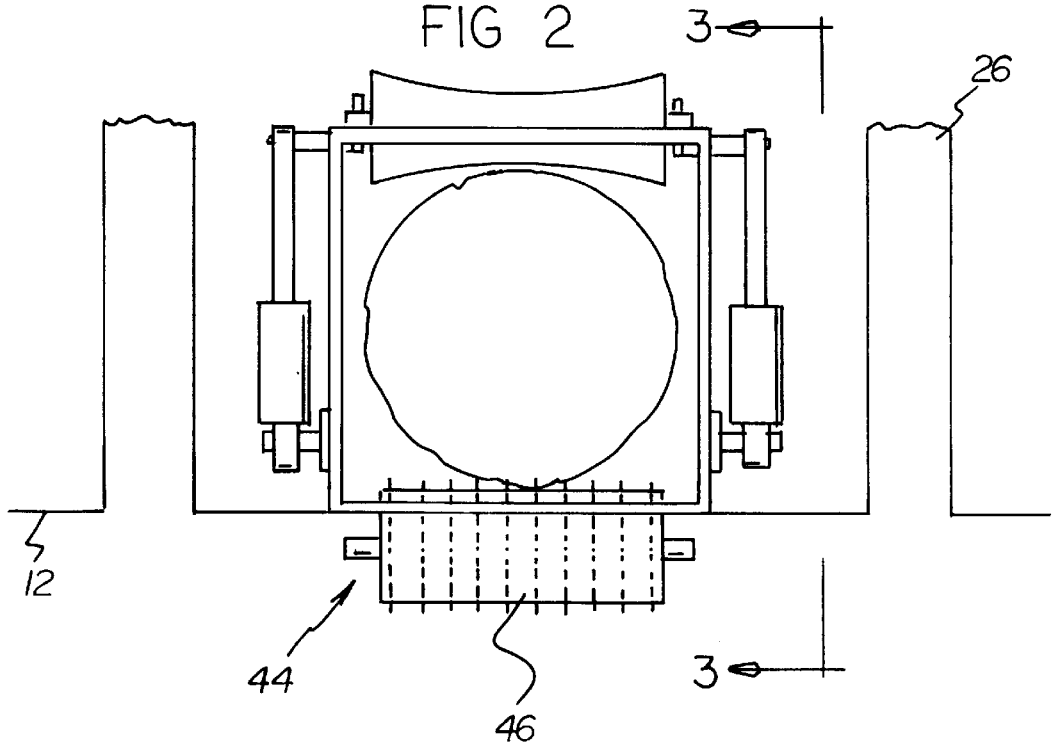
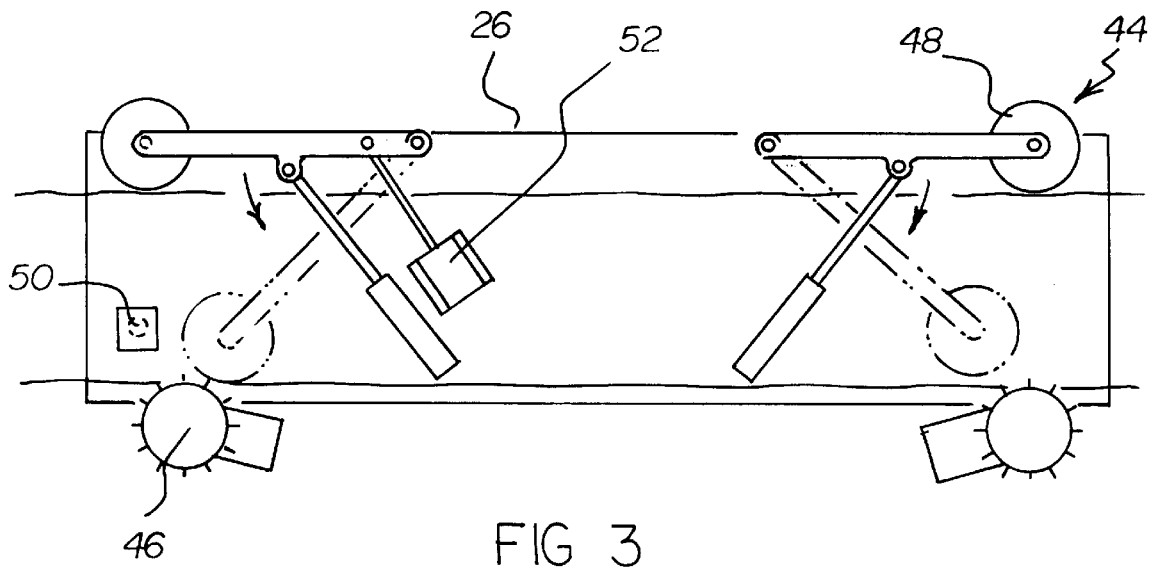

TIMBER HARVESTER

BACKGROUND OF THE INVENTION

1. Field of the Invention

The present invention relates to log cutting systems and more particularly pertains to a new timber harvester for conveniently limbing and cutting to sort logs with a portable apparatus.

2. Description of the Prior Art

The use of log cutting systems is known in the prior art. More specifically, log cutting systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art log cutting systems include U. S. Pat. No. 3,974,866; U.S. Pat. No. 4,779,654; U.S. Pat. Des. 248,953; U.S. Pat. No. 4,815,506; and U.S. Patent No. 4,907,294.

In these respects, the timber harvester according to the present invention substantially departs from the conventional concepts and designs of the prior art, and in so doing provides an apparatus primarily developed for the purpose of conveniently limbing and cutting to sort logs with a portable apparatus.

SUMMARY OF THE INVENTION

In view of the foregoing disadvantages inherent in the known types of log cutting systems now present in the prior art, the present invention provides a new timber harvester construction wherein the same can be utilized for conveniently limbing and cutting to sort logs with a portable apparatus.

The general purpose of the present invention, which will be described subsequently in greater detail, is to provide a new timber harvester apparatus and method which has many of the advantages of the log cutting systems mentioned heretofore and many novel features that result in a new timber harvester which is not anticipated, rendered obvious, suggested, or even implied by any of the prior art log cutting systems, either alone or in any combination thereof.

To attain this, the present invention is adapted for use with a trailer having a rectangular configuration with a front end, a rear end and a pair of side edges. The trailer includes an adjustable hitch with an inboard extent pivotally coupled to the front end of the trailer about a horizontal axis. Pivotally coupled to a front end of the inboard extent is an outboard extent. The outboard extent has a hitch mounted thereon, as shown in FIG. 1. In use, the inboard and outboard extents are adapted to be pivoted between a horizontal first orientation and a second orientation wherein the outboard extent remains in a horizontal plane above the trailer. Two pairs of wheels are each mounted to an associated one of the side edges of the timber harvester adjacent to the rear end thereof. A plurality of stabilizers are mounted to the side edges of the trailer for being selectively lowered during use. The present invention further includes a harvester housing. FIG. 1 shows a loader rotatably mounted to a top of the harvester housing about a vertical axis. The loader has an arm with an inboard extent pivotally coupled to the loader about a horizontal axis. An outboard extent is pivotally coupled to an outboard end of the inboard extent about a horizontal axis. The outboard extent of the loader is equipped with a claw connected thereto for lifting logs. Next provided is a front saw having an inboard end pivotally coupled to the timber harvester in front of the harvester housing. The front saw pivots within a vertical plane which traverses the timber harvester for cutting purposes. Also included is a pair of sheer assemblies each mounted on the timber harvester between a rear end thereof and the harvester housing. Each shear assembly includes pair of arcuate shears with sharpened edges. As shown in FIG. 5, the shear assemblies include a vertical shear assembly for clamping and shearing a top surface and a bottom surface of a log. Associated therewith is a horizontal shear assembly for clamping and shearing side surfaces of a log. See FIG. 4. FIGS. 2 & 3 depict a drive assembly including a pair of cylindrical drive wheels with a plurality of tines extending radially therefrom. The drive wheels are rotatably coupled about horizontal axes between side edges of the timber harvester beneath a front and rear of the harvester housing. In use, the drive wheels function for transporting the log through the harvester housing. A pair of idlers include cylindrical rollers each having a pair of arms with outboard ends rotatably coupled to the rollers. Such arms further have inboard ends pivotally coupled to sides of the timber harvester. As shown best in FIG. 3, hydraulics are mounted between the harvester and arms for providing a downward force on the log while passing through the harvester housing. For sensing a front of the log being passed through the harvester housing of the timber harvester, a light detector is mounted to a front of the harvester housing. The light detector is adapted for the purpose of actuating a length counter when the log is detected. Finally, a log diameter detecting solenoid is positioned on one of the idlers of the drive assembly. As shown in FIG. 3, the log diameter detecting solenoid is adapted for determining a diameter of the log and deactuating the front saw upon the diameter of the log falling below a predetermined amount.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new timber harvester apparatus and method which has many of the advantages of the log cutting systems mentioned heretofore and many novel features that result in a new timber harvester which is not anticipated, rendered obvious, suggested, or even implied by any of the prior art log cutting systems, either alone or in any combination thereof.

It is another object of the present invention to provide a new timber harvester which may be easily and efficiently manufactured and marketed.

It is a further object of the present invention to provide a new timber harvester which is of a durable and reliable construction.

An even further object of the present invention is to provide a new timber harvester which is susceptible of a low cost of manufacture with regard to both materials and labor, and which accordingly is then susceptible of low prices of sale to the consuming public, thereby making such timber harvester economically available to the buying public.

Still yet another object of the present invention is to provide a new timber harvester which provides in the apparatuses and methods of the prior art some of the advantages thereof, while simultaneously overcoming some of the disadvantages normally associated therewith.

Still another object of the present invention is to provide a new timber harvester for conveniently limbing and cutting to sort logs with a portable apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a rear view of the present invention.

FIG. 3 is a side view of the drive assembly of the present invention.

DESCRIPTION OF THE PREFERRED EMBODIMENT

Figure 1:
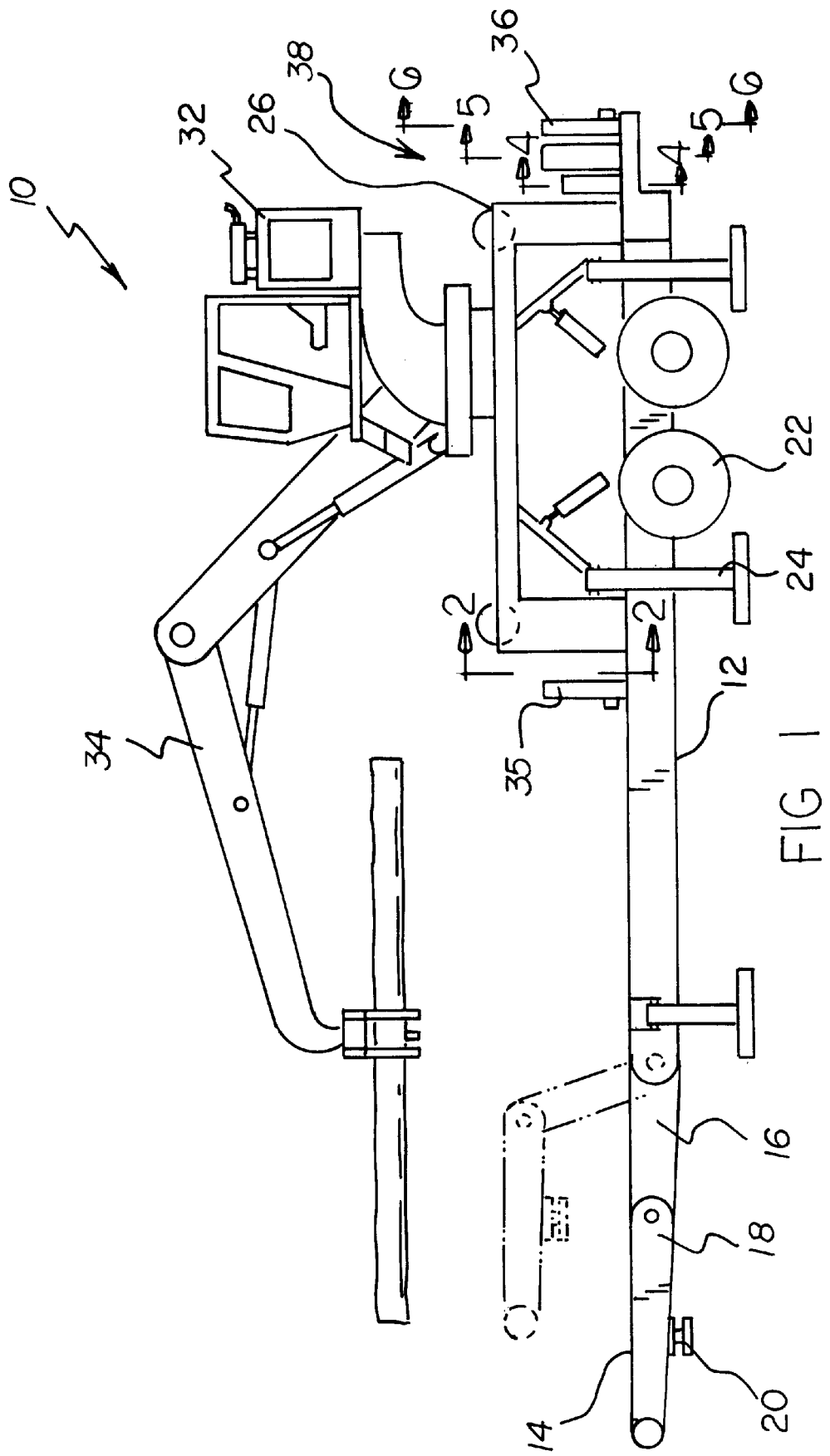
FIG. 1 is a side view of a new timber harvester according to the present invention.
Figure 6:
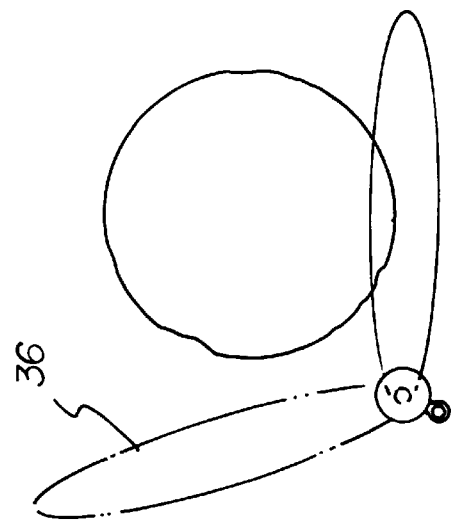
FIG. 6 is an illustration of the saw of the present invention.

With reference now to the drawings, and in particular to FIGS. 1 through 6 thereof, a new timber harvester embodying the principles and concepts of the present invention and generally designated by the reference numeral 10 will be described.

The present invention, designate as numeral 10, is adapted for use with a trailer 12 having a rectangular configuration with a front end, a rear end and a pair of side edges. The trailer includes an adjustable hitch 14 with an inboard extent 16 pivotally coupled to the front end of the trailer about a horizontal axis. Pivotally coupled to a front end of the inboard extent of the hitch is an outboard extent 18. The outboard extent has a hitch 20 mounted to a lower surface thereof, as shown in FIG. 1. In use, the inboard and outboard extents are adapted to be pivoted between a horizontal first orientation and a second orientation wherein the outboard extent remains in a horizontal plane above the trailer.

Two pairs of wheels 22 are each mounted to an associated one of the side edges of the trailer adjacent to the rear end thereof. A plurality of stabilizers 24 are mounted to the side edges of the trailer for being selectively lowered during use, as is conventional in the art.

The present invention includes a harvester housing 26 mounted on the trailer. FIG. 1 shows a loader 32 rotatably mounted to a top of the harvester housing about a vertical axis. The loader has an arm 34 with an inboard extent pivotally coupled to the loader about a horizontal axis. An outboard extent is pivotally coupled to an outboard end of the inboard extent about a horizontal axis. The outboard extent of the loader is equipped with a claw connected thereto for lifting logs. In the preferred embodiment, the loader is equipped with a cab for allowing a user to control the present invention from atop the harvester housing. It should be noted that the present invention may also be used with a conventional loader separate from the trailer.

The key components, or focus, of the present invention are located under the loader atop the trailer and reside within or adjacent to the harvester housing. Such components include a front saw 35 having an inboard end pivotally coupled in front of the harvester housing. The front saw pivots within a vertical plane which traverses the timber harvester for cutting the logs into small sections. Further provided is a rear saw 36 with similar structure as that of the front saw. The rear saw, however, functions merely to remove stray limbs of the log prior to being cut into sections.

Figure 5:
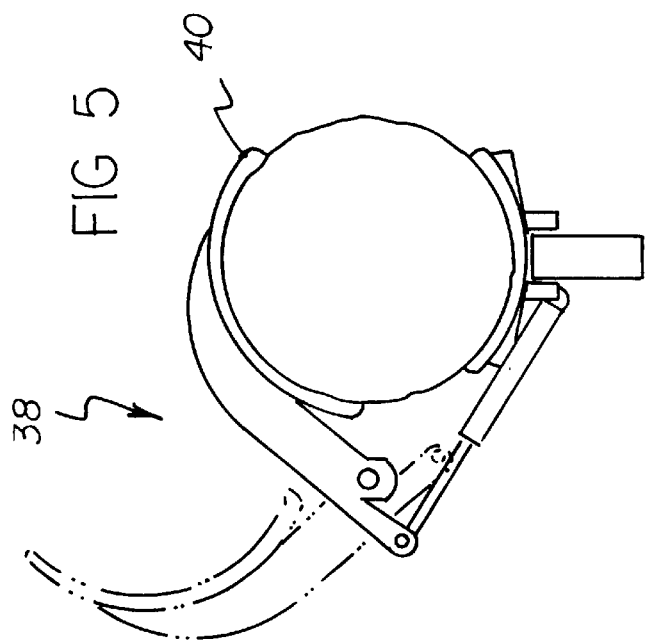
FIG. 5 is a rear view of the horizontal sheer assembly of the present invention.
Figure 4:
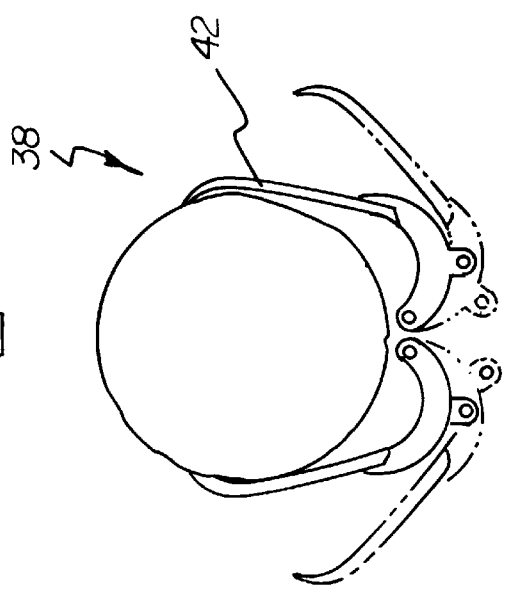
FIG. 4 is a rear view of the vertical sheer assembly of the present invention.

Also included is a pair of shear assemblies 38 each mounted on the timber harvester between a rear end thereof and the harvester housing. Each shear assembly includes pair of arcuate shears with sharpened edges. As shown in FIG. 5, the shear assemblies include a vertical shear assembly 40 for clamping and shearing a top surface and a bottom surface of a log. Associated therewith is a horizontal shear assembly 42 for clamping and shearing side surfaces of a log. See FIG. 4.

FIGS. 2 & 3 depict a drive assembly 44 including a pair of cylindrical drive wheels 46 with a plurality of tines extending radially therefrom. The drive wheels are rotatably coupled about horizontal axes between side edges of the timber harvester beneath a front and rear of the harvester housing. In use, the drive wheels function for transporting the log through the harvester housing upon being received via the loader. Prior to entering the drive assembly, the rear saw and sheer assemblies remove unwanted limbs from the log. It should be noted that the drive assembly, sheers assemblies and saws may be automatically or manually controlled depending on the preferences of the user.

The drive assembly further includes a pair of idlers 48 with cylindrical rollers each having a pair of arms with outboard ends rotatably coupled to the rollers. Such arms further have inboard ends pivotally coupled to sides of the timber harvester. As shown in FIG. 2, the rollers of the idlers have an arcuate outer surface to conform to an outer surface of the log. As shown best in FIG. 3, hydraulics are mounted between the timber harvester and arms for providing a downward force on the log while passing through the harvester housing.

For sensing a front of the log being passed through the harvester housing of the timber harvester, a light detector 50 is mounted to a front of the harvester housing. The light detector is adapted for actuating a length detector and the front saw when the log is detected. Given the speed of the log effected by the drive assembly, selected lengths of the logs may be calculated by the length detector and cut by the front saw in an automatic fashion.

Finally, a log diameter detecting solenoid 52 is positioned on one of the idlers of the drive assembly. As shown in FIG. 3, the log diameter detecting solenoid is coupled between the harvester housing and one of the arms of the idlers. In operation, the solenoid is adapted for determining a diameter of the log and deactuating the front saw upon the diameter of the log falling below a predetermined amount. As such, portions of logs with insufficient diameter are merely passed through the drive assembly to the front of the harvester housing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A harvester comprising, in combination:
a trailer having a rectangular configuration with a front end, a rear end and a pair of side edges, the trailer including an adjustable hitch with an inboard extent pivotally coupled to the front end of the trailer about a horizontal axis and an outboard extent pivotally coupled to a front end of the inboard extent about a horizontal axis with the outboard extent having a hitch mounted thereon wherein the inboard and outboard extents are adapted to be pivoted between a horizontal first orientation and a second orientation where in the outboard extent remains in a horizontal plane above the trailer, two pairs of wheels each mounted to an associated one of the side edges of the trailer adjacent to the rear end thereof, and a plurality of stabilizers which are selectively lowered;
a harvester housing mounted on the trailer;
a loader rotatably mounted to a top of the harvester housing about a vertical axis, the loader having an arm with an inboard extent pivotally coupled to the loader about a horizontal axis and an outboard extent pivotally coupled to an outboard end of the inboard extent about a horizontal axis with the outboard extent having a claw connected thereto for lifting logs;
a front saw having an inboard end pivotally coupled in front of the harvester housing, wherein the front saw pivots within a vertical plane, the front saw being for cutting a log into sections;
a rear saw pivotally coupled in back of the harvester housing for removing limbs of a log;
a pair of shear assemblies each mounted between a rear end of the trailer and the harvester housing and including a pair of arcuate shears with sharpened edges, the shear assemblies including a first shear assembly for clamping and shearing a top surface and a bottom surface of a log and a second shear assembly for clamping and shearing side surfaces of a log;
a drive assembly including a pair of cylindrical drive wheels with a plurality of tines extending radially therefrom rotatably coupled about horizontal axes beneath a front and rear of the harvester housing for transporting the log through the harvester housing, a pair of idlers including cylindrical rollers each having a pair of arms with outboard ends rotatably coupled to the rollers and inboard ends pivotally coupled to sides of the harvester with hydraulics for providing a downward force on the log while passing through the harvester housing;
a light detector mounted to a front of the harvester housing for sensing a front of the log being passed through the harvester housing for the purpose of actuating the front saw; and
a log diameter detecting solenoid mounted on one of the idlers of the drive assembly for determining a diameter of the log and deactuating the front saw upon the diameter of the log falling below a predetermined amount.

2. A harvester for use with a trailer including a hitch and a plurality of wheels mounted thereon, the harvester comprising:
a harvester housing mounted on the trailer;
a saw connected to a harvester housing for cutting purposes;
a rear saw pivotally coupled in back of the harvester housing for removing limbs of a log; and
a drive assembly for guiding logs past the saw for cutting the same.

3. A harvester as set forth in claim 2 wherein the drive assembly includes at least one drive wheel with tines extending radially therefrom.

4. A harvester as set forth in claim 3 wherein the drive assembly includes at least one idle roller adapted to apply a downward force against the log and drive wheel.

5. A harvester as set forth in claim 2 and further including a light detector for automatically actuating the saw.

6. A harvester as set forth in claim 2 and further including a diameter detector for automatically deactuating the saw upon a diameter of the log falling below a predetermined amount.

7. A harvester as set forth in claim 2 and further including shears for clipping branches from the log prior to the same entering the drive assembly.

* * * * *